(12) United States Patent
Kohlstadt et al.

(10) Patent No.: US 6,372,135 B1
(45) Date of Patent: *Apr. 16, 2002

(54) FILTER FOR HOLDING AND RAISING GROUND WATER

(75) Inventors: Hans-Peter Kohlstadt, Velbert; Klaus Marten, Dormagen; Lothar Thiele, Leichlingen; Werner Fahle, Cottbus; Rainer Tost, Cottbus; Annebärbel Tost, Cottbus; Peter Tost, Cottbus; Frank Tost, Cottbus, all of (DE)

(73) Assignees: Henkel Kommanditgesellschaft auf Aktien, Duesseldorf (DE); Lausitzer Braunkohle, Senftenberg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/967,255

(22) Filed: Nov. 6, 1997

Related U.S. Application Data

(63) Continuation of application No. 08/532,644, filed as application No. PCT/EP94/00835 on Mar. 10, 1994, now abandoned.

(30) Foreign Application Priority Data

Apr. 2, 1993 (DE) ........................................ P 43 10 725

(51) Int. Cl.$^7$ ................................................ B01D 27/00
(52) U.S. Cl. .............................. 210/497.01; 210/502.1; 210/503; 210/506
(58) Field of Search .............................. 264/328.2, 349, 264/DIG. 48; 210/496, 497.01, 502.1, 503, 504, 506, 510.1, 747, 767

(56) References Cited

U.S. PATENT DOCUMENTS

| 4,150,194 A | * | 4/1979 | Watts et al. |
| 5,094,775 A | * | 3/1992 | Bailey, Jr. |
| 5,648,421 A | * | 7/1997 | Thiele et al. ................ 524/789 |

FOREIGN PATENT DOCUMENTS

| DE | 4320118 | * 12/1994 |
| DE | 4320269 | * 12/1994 |

\* cited by examiner

*Primary Examiner*—Robert J. Popovics
(74) *Attorney, Agent, or Firm*—Wayne C. Jaeschke; Stephen D. Harper; Peter DeLuca

(57) ABSTRACT

The invention relates to a filter in which dust-containing silica sand is held together by a polyurethane binder, the polyurethane binder containing an organotin compound with a molecular weight of more than 600 as catalyst and a mixture of highly dispersed silica and/or bentonites with a thickened aluminosilicate as modifier. The filter is particularly suitable for the production of drinking water from ground water in surface mining regions.

20 Claims, No Drawings

FILTER FOR HOLDING AND RAISING GROUND WATER

This Application is a File Wrapper Continuation under 37 C.F.R. § 1.62 of Serial No. 08/532,644, filed Mar. 5, 1996, now abandoned which is a 371 of PCT/EP94/00835 file on Mar. 10, 1994.

BACKGROUND OF THE INVENTION

1. Field of the Invention

This invention relates to a filter of polyurethane-bonded solid layer of silica sand for holding and raising ground water, for treating industrial water and drinking water and for the infiltration of water into the ground and to the production and use of the filter in surface mining regions.

2. Discussion of Related Art

One such filter for surface mining regions is known from DD 109 319. This document describes a filter produced from dry granular components suitable as a filter material and a two-component polyurethane adhesive, the ratio by weight being at least 20:1. Gravel sand with a particle size of 1.6 to 3.5 mm is preferably used as the granular filter material. The mixture of the two constituents is preferably cured in the presence of a catalyst at temperatures not exceeding 120° C. The known filter has the disadvantage that it is not suitable for the production of drinking water because the filtrate foams and contains organically bound carbon in unacceptable quantities. In addition, dust-containing silica sand filters produced with a polyurethane adhesive without a modifying agent turn soft when stored in water.

In addition, European patent application 0 468 608 describes a drainage element of a mixture consisting of 20 to 30 parts by weight of dried filter gravel as aggregate and 1 part by weight of a polyurethane-based resin as binder. The dust in the filter gravel interferes with the production of the drainage elements. Where the unidentified polyurethane binder is used, the drainage element is difficult if not impossible to demold. The percentage of useable elements is very small. In addition, the concentration of binder distinctly increases in the downward direction in the individual elements. It is not possible to achieve uniform strength throughout the drainage element.

Accordingly, the problem addressed by the present invention was inexpensively to produce a filter with which ground water could be held, particularly in surface mining regions and used for the production of industrial water and drinking water. The filter would of course meet mechanical requirements which its intended application involves.

SUMMARY OF THE INVENTION

The solution provided by the invention is defined in the claims. It lies essentially in the use of a certain binder system based on a polyurethane adhesive. According to the characterizing clause, the binder contains an organotin compound with a molecular weight of more than 600 as catalyst and a mixture of highly dispersed silica and/or bentonite with a thickened aluminosilicate as modifier.

DETAILED DESCRIPTION OF THE INVENTION

In the context of the invention, the "polyurethane binder" is understood to be a adhesive binder consisting of polyisocyanates, polyols, catalysts, modifiers and fillers. A two-component polyurethane adhesive is preferably used, a low molecular weight polyisocyanate and a relatively low molecular weight polyol containing the other additives being mixed together shortly before the use of the adhesive.

PolyhydroxyPolyethers known per se with a molecular weight of 60 to 10,000 and preferably 70 to 6,000 containing 2 to 10 hydroxyl groups are particularly suitable for the production of the reactive isocyanate/polyol resin. Polydyhdroxypolyethers such as these are obtained in known manner by alkoxylation of suitable starter molecules, for example water, propylene glycol, ethylene glycol, glycerol, trimethylol propane. Suitable alkoxylating agents are, in particular, propylene oxide and even ethylene oxide.

Suitable polyisocyanates are any polyfunctional aromatic and aliphatic isocyanates. In a preferred embodiment, they contain an average of 2 to at most 4 NCO groups. Aromatic isocyanates are preferred, diphenyl methane diisocyanate being particularly preferred.

The polyols and polyisocyanates are preferably used as a two-component casting resin, a low molecular weight polyisocyanate and relatively low molecular weight polyol being mixed together just before the use of the resin. The polyisocyanate is used with an excess of isocyanate of up to 30%, based on the polyol, and preferably with an excess of 10 to 25%.

The "organotin compound" is understood to be a compound containing one or more Sn—C bonds. Specific compounds are dibutyl and dioctyl tin dilaurate, dioctyl tin di-2-ethylhexoate, dibutyl and dioctyl tin distearate, dibutyl and dioctyl tin didodecyl thiolate, butyl and octyl tin tris-(thioglycolic acid-2-ethylhexoate), dibutyl and dioctyl tin bis-(thioglycolic acid-2-ethylhexoate), tributyl and trioctyl tin (thioglycolic acid-2-ethylhexoate) and tributyl and trioctyl tin tris-(thioethyleneglycol-2-ethylhexoate), tributyl and trioctyl tin bis (thioethyleneglycol-2-ethylhexoate), tributyl and trioctyl tin (thioethyleneglycol-2-ethylhexoate) with the general formula $R_nSn(S—CH_2CH_2OCOC_8H_{17})_{4-n}$, where R is a $C_{4-8}$ alkyl group, bis-(β-methoxycarbonylethyl)-tin-bis-(thio-ethyleneglycol-2-ethylhexoate,-tin-bis-(thioglycolic acid-2-ethylhexoate), -tin dilaurate, -tin dodecyl thiolate and bis-(β-acetylethyl)-tin-bis-(thioethylene-glycol-2-ethylhexoate), -tin-bis-(thioglycolic-acid-2-ethylhexoate), -tin dilaurate and -tin didodecyl thiolate.

The organotin compounds may be used individually or in admixture with one another in quantities of 0.001 to 0.5% by weight and preferable in quantities of 0.01 to 0.25% by weight, based on the polyol.

By "highly dispersed silica" is meant a silica containing more than 99.8% by weight of $SiO_2$ which has been produced by hydrolysis of silicon tetrachloride in an oxyhydrogen gas flame. It is commercially available, for example, under the name of "AEROSIL®".

"Bentonites" are impure clays formed by the weathering of volcanic tuffs. Products available under the name of "BENTONE®" are particularly suitable.

A preferred "thickened aluminosilicate" is absorber paste, more particularly based on castor oil. This is intended to neutralize the effects of moisture in the PUR components. The aluminosilicate concentration is governed by the expected moisture content and is generally between 1 and 12% by weight and more particularly between 2 and 8% by weight, based on the polyol.

The polyol may also contain 0 to 60% by weight and, more particularly, 10 to 30% by weight of at least one filler. It is intended not only to increase the weight and volume, but also to improve useability on a wide scale. Particularly suitable fillers are kaolin, feldspar, mica, silica flour, barium sulfate, aluminium oxides, hydrated aluminium oxides and aluminium hydroxides and also calcium carbonate both as lime spar and as limestone which may be coated. The particle size of the filler is up to 0.05 mm.

Depending on the particular application envisaged, it may be advisable to stabilize the polyurethane against degradation. Suitable antioxidants are, in particular, up to 1.5% by weight of IRGANOX 1010, 1076, 3114 and 1425 antioxidants (products of Ciba Geigy), TOPANOL O antioxidant (a product of ICI) and GOODRITE 3114 antioxidant (a product of Goodrich). Suitable UV absorbers are, in particular, up to 1.5% by weight of TINUVIN P, 328 and 144 UV absorbers (products of Ciba Geigy), SANDUVOR VSU and 3035 UV absorbers (Sandoz), CHIMASSORB 81 UV absorber (a product of Chimosa). Other suitable stabilizers are up to 1.5% by weight of TINUVIN 765 and 770 stabilizer (products of Ciba Geigy), SANDUVOR 3050, 3051 and 3052 (products of Sandoz) and CHIMASSORB 119 stabilizer (a product of Chimosa) and also MARK LA 62, 63, 67 and 68 stabilizers (products of Argus Chemical Corporation).

The binder must be adapted in its composition and quantity to the particle size of the silica sand, more particularly its dust content, and to the application envisaged, more particularly in regard to strength and the water throughflow rate. Thus, any reduction in the particle size increasingly requires special modification of the binder.

The ratio by weight of silica sand to polyurethane binder is preferably less than 20:1 and, more particularly, equal to or less than 16:1. For a particle size of 1.6 to 4.0 mm, equal quantities by weight of silica sand and binder are required for filters with a water flow rate of 0 m$^3$/min·m$^2$. With a sand having a particle size of up to 4 mm, but with 20% by weight of particles smaller than 1.6 mm (based on the total quantity of sand), the percentage binder content falls to around 10% by weight, based on the sand as a whole.

The filter material held together by the binder is silica sand. More than 85% by weight of the silica sand consists of quartz and has a particle size of up to 6 mm and more particularly up to 4 mm. The silica sand contains up to 2% by weight and, more particularly, up to 1% by weight of quartz-containing fine dusts smaller than 0.2 mm in diameter and, more particularly, between 0.06 and 0.1 mm in diameter. The percentage dust content is determined by the process used to wash and dry the silica sand. A water throughflow rate corresponding to the specific conditions of 0 m$^3$/min·m$^2$ to 3 m$^3$/min·m$^2$ is achieved through different classifications of the silica sand taking its fine dust content into account.

Specific in-use conditions are understood to be the grading curves of the geological material of a ground water conductor. Accordingly, by correspondingly graduating the particle classifications as described above, a laminar ground water flow into the well is normally achieved using a layer of gravel between the ground water conductor and the filter. The wall of the described filter acts as a second layer of gravel and enhances the laminar flow effect.

In principle, the filter may assume any geometric form, depending on the particular applications envisaged. More particularly, the filters may be in the form of plates or tubes. They are preferably circular cylindrical tubes with a length which makes them convenient to handle. The diameter and thickness of the tubes are governed by the size and length of the well produced from them.

The filter is preferably free from additional elements for increasing its mechanical strength. Accordingly, it consists of the silica sand with its dust content and the polyurethane binder system.

The filter material generally consists of 80 to 95% by weight of gravel sand and 5 to 20% by weight of polyurethane adhesive. In general, 50 to 99% by weight of the polyurethane adhesive consists of reactive isocyanate/polyol resin, 0.0005 to 0.25% by weight of organotin compounds, 0.03 to 2.5% by weight of silica and/or bentonites, 0.5 to 6% by weight of aluminosilicates and 0 to 50% by weight of fillers.

The filters are produced by adding the non-foaming polyurethane binder system without water to the silica sand with a quantity of dust determined by the washing and drying process. The two polyurethane components, namely the catalysts and the modifier, are preferably first mixed together and then added to the silica sand. The mixture is then intensively mixed and introduced into a mold in which it is heated for at most 10 minutes to a temperature above 120° C. and, more particularly, to a temperature of 125 to 150° C. The filters are demolded without cooling. After cooling to room temperature, the filters obtained may immediately be used for their intended purpose, i.e. they may be used in the production of drinking water without any further treatment.

Accordingly, the curing process according to the invention is highly economical because typical polyurethane adhesives require very long curing times at temperatures above 100° C. if the filtrate is to be of drinking water quality.

The filters according to the invention are suitable for the production of industrial water and drinking water from ground water and for the infiltration of water into the ground. Because the water throughflow rates can be freely selected, it is possible to build wells which eliminate the need to connect various ground water carriers by the lining of ground water carriers containing unwanted water with water-impermeable tubes, so-called solid tubes with a permeability to water of 0 m$^3$/min·m$^2$. Earth layers containing the required water are lined with water-permeable filters.

However, the filters may also be used for irrigation, for example by constructing infiltration wells.

The use of the filters according to the invention containing silica sand with very fine particles smaller than 1.6 mm in diameter eliminates the need for expensive cleaning of the original sand which is required in the known process according to DD 109 319. It is these very fine particles which allow the production of filters with varying water throughflow rates at relatively low cost by virtue of the minimal consumption of polyurothane binders.

The invention is illustrated by the following Examples.

EXAMPLE 1

Production of a Filter Tube

The resin component consists of:

53 parts of a difunctional polypropylene glycol with an OH value of approximately 280, 8 parts of a trifunctional polypropylene glycol with an OH value of approximately 380, 29.17 parts of a kaolin, 8.00 parts of sodium aluminium silicate in castor oil (1:1 mixture), 0.03 part of dibutyl tin dilaurate and 1.8 parts of [Bentone] BENTONE 34 clay (parts=parts by weight).

The curing component consists of diphenylmethane-4,4'-diisocyanate.

100 Parts by weight of the resin are mixed with 65 parts by weight of the curing component at around 20° C. in a dynamic mixer and the resulting mixture is subsequently mixed in a screw mixer with four times the quantity by weight of gravel sand with a particle size of 1.0 to 4.0 mm and a dust content of 0.5% by weight. The resulting mixture is introduced into a tube mold 1 meter in length and cured for 9 minutes at 135° C. After this time, the filter tube can readily be demolded, i.e. does not adhere to the mold walls, virtually without cooling. After cooling to room temperature, the filter tube may immediately be used for a defined water throughflow rate according to the particle classification selected. In the described Example, the water throughflow rate is approximately 3 m³/min·m³.

EXAMPLE 2

Production of a Solid Tube

The resin component consists of:

30 parts by weight of difunctional polypropylene glycol with an OH value of approximately 280 mg KOH/g, 12 parts by weight of trifunctional polypropylene glycol with an OH value of approximately 380, 49.08 parts by weight of limestone flour with a particle size of <0.05 mm, 8 parts by weight of sodium aluminium silicate in castor oil (1:1 mixture), 0.02 part by weight of dibutyl tin dilaurate and 0.90 part by weight of AEROSIL 200 silica.

The curing component again consists solely of diphenylmethane-4,4'-diisocyanate (crude product).

The resin and the curing component are mixed in a ratio by weight of 3:1 in a dynamic mixer and the resulting mixture is then intensively mixed in a screw mixer at room temperature with eight times the quantity by weight of gravel sand with a particle size of 0.5 to 1.6 mm and a dust content of 0.8% by weight. The resulting mixture is introduced into the tube mold and cured for 9 minutes at 130° C. The filter tube may then be demolded virtually without cooling without sticking to the walls of the mold. After cooling to room temperature, the filter tube may immediately be used for a given water throughflow rate in accordance with the particle classification selected. In the present Example, the water throughflow rate is under 0.1 m³/min·m².

EXAMPLE 3

Comparison Example

The resin component consists of 56 parts by weight of difunctional polypropylene glycol with an OH value of approximately 280 mg KOH/g, 10 parts by weight of a trifunctional polypropylene glycol with an OH value of 380 mg KOH/g, 33.97 parts by weight of kaolin and 0.03 part by weight of dibutyl tin dilaurate.

Diphenylmethane-4,4'-diisocyanate is again used as the curing component.

100 Parts by weight of the resin are mixed with 67 parts by weight of the curing component and then with silica sand as in Example 1 and the resulting mixture is introduced into the tube mold and again cured for 9 minutes at 135° C.

The filter tube is extremely difficult to demold, adhering partly to the walls of the mold. In contrast to Examples 1 and 2, the concentration of adhesive increases distinctly in the downward direction. After cooling, particles of gravel can be removed by hand by applying moderate force to the upper edge of the tube. In addition, in contrast to the tubes according to the invention, this tube softens very considerably after storage in water for only 1 day. After storage in water for 4 days, parts can be broken off from the tube by hand.

What is claimed is:

1. A filter useful for holding and raising ground water, for treating industrial water and drinking water, and for the infiltration of water into the ground, said filter comprising a solid layer of silica sand formed by consolidating silica sand via use of a polyurethane adhesive, wherein said polyurethane adhesive comprises, in addition to a polyol and a polyisocyanate, an organotin compound with a molecular weight of more than 600 as catalyst and a mixture of a thickened aluminosilicate and a member selected from the group consisting of highly dispersed silica and bentonite.

2. A filter as claimed in claim 1 wherein said thickened aluminosilicate is absorber paste.

3. A filter as claimed in claim 1 wherein the weight ratio of silica sand to polyurethane adhesive is less than 20:1.

4. A filter as claimed in claim 1 wherein the weight ratio of silica sand to polyurethane adhesive is equal to or less than 16:1.

5. A filter as claimed in claim 1 wherein said silica sand has a particle size of up to 6 mm.

6. A filter as claimed in claim 1 wherein said silica sand has a particle size of up to 4 mm.

7. A filter as claimed in claim 1 wherein said silica sand contains a quartz-containing fine dust with a diameter of less than 0.2 mm.

8. A filter as claimed in claim 1 wherein said silica sand contains a quartz-containing fine dust with a diameter between 0.06 and 0.1 mm.

9. A filter as claimed in claim 1 wherein said silica sand contains up to 2% by weight of a quartz-containing fine dust.

10. A filter as claimed in claim 1 wherein said silica sand contains up to 1% by weight of a quartz-containing fine dust.

11. A filter as claimed in claim 1 wherein said filter is a cylindrical filter.

12. A filter as claimed in claim 11 wherein said filter has circular cross-section and no additional elements for increasing mechanical strength.

13. A filter as claimed in claim 1 wherein said thickened aluminosilicate is present in an amount of between 1% and 12% by weight of the polyol in said polyurethane adhesive.

14. A filter as claimed in claim 1 wherein said thickened aluminosilicate is present in an amount of between 2% and 8% by weight of the polyol in said polyurethane adhesive.

15. A filter as claimed in claim 1 wherein said polyurethane adhesive is further comprised of a filler in an amount of up to 60% by weight of said polyol.

16. A filter as claimed in claim 1 wherein said polyurethane adhesive is further comprised of a filler in an amount of 10 to 30% by weight of said polyol.

17. A filter as claimed in claim 1 wherein said polyurethane adhesive is further comprised of a filler selected from the group consisting of kaolin, feldspar, mica, silica flour, barium sulfate, aluminum oxides, hydrated aluminum oxides and aluminum hydroxides and calcium carbonate.

18. A filter as claimed in claim 1 wherein said polyurethane adhesive is further comprised of a filler having a particle size of up to 0.05 mm.

19. A filter useful for holding and raising ground water, for treating industrial water and drinking water, and for the infiltration of water into the ground, said filter comprising a polyurethane-adhesive-bonded solid layer of silica sand, wherein said layer is comprised of from 80% to 95% by weight of silica sand and from 5% to 20% by weight of a polyurethane adhesive and wherein said polyurethane adhesive comprises, in addition to a polyol and a polyisocyanate, an organotin compound with a molecular weight of more than 600 as catalyst in an amount from 0.0005 to 0.25% by weight of said polyurethane adhesive, an aluminosilicate in an amount of 0.5% to 6% by weight of said polyurethane adhesive, and a member selected from the group consisting of highly dispersed silica and bentonite in an amount of 0.03% to 2.5% by weight of said polyurethane adhesive.

20. A filter as claimed in claim 19 wherein said silica sand has a particle size of up to 4 mm and contains up to 1% by weight of quartz-containing fine dusts having a particle size between 0.06 and 0.1 mm in diameter.

\* \* \* \* \*

UNITED STATES PATENT AND TRADEMARK OFFICE
CERTIFICATE OF CORRECTION

PATENT NO.    : 6,372,135 B1
DATED         : April 16, 2002
INVENTOR(S)   : Kohlstadt et al.

It is certified that error appears in the above-identified patent and that said Letters Patent is hereby corrected as shown below:

<u>Title page,</u>
Item [63], Related U.S. Application Data, delete "Mar. 10, 1994"; and insert therefor -- Mar 16, 1994 --.

Signed and Sealed this

Sixth Day of May, 2003

JAMES E. ROGAN
*Director of the United States Patent and Trademark Office*